US010122521B2

(12) United States Patent
Ziren et al.

(10) Patent No.: US 10,122,521 B2
(45) Date of Patent: Nov. 6, 2018

(54) NETWORK NODE OF A TIME DIVISION DUPLEX SYSTEM, AND ARRANGEMENT, METHOD, AND COMPUTER PROGRAM THEREFOR

(71) Applicant: Telefonaktiebolaget LM Ericsson (publ), Stockholm (SE)

(72) Inventors: Mikael Ziren, Kavlinge (SE); Kumar Balachandran, Pleasanton, CA (US); Virgil Cimpu, Ottawa (CA); Yusheng Liu, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 244 days.

(21) Appl. No.: 15/259,967

(22) Filed: Sep. 8, 2016

(65) Prior Publication Data
US 2018/0069684 A1  Mar. 8, 2018

(51) Int. Cl.
*H04L 5/14* (2006.01)
*H04W 56/00* (2009.01)
*H04W 72/12* (2009.01)

(52) U.S. Cl.
CPC ........... *H04L 5/14* (2013.01); *H04W 56/0045* (2013.01); *H04W 56/0065* (2013.01);
(Continued)

(58) Field of Classification Search
CPC  H04L 5/14; H04W 72/1257; H04W 72/1284; H04W 72/1289; H04W 56/0065; H04W 56/0045
See application file for complete search history.

(56) References Cited

U.S. PATENT DOCUMENTS 9,184,896 B2 * 11/2015 Oizumi ................ H04L 1/1854
2013/0188533 A1 * 7/2013 He ....................... H04J 3/1605
370/280
(Continued)

FOREIGN PATENT DOCUMENTS

WO   2015034301 A1   3/2015
WO   2015084226 A1   6/2015

OTHER PUBLICATIONS

Erik Dahlman et al., 3G Evolution: HSPA and LTE for Mobile Broadband, Chapter 16.3.5, 5 pages.
(Continued)

Primary Examiner — Min Jung
(74) Attorney, Agent, or Firm — Leffler Intellectual Property Law, PLLC

(57) ABSTRACT

A method of a network node of a time division duplex (TDD) system is disclosed. The method comprises acquiring a maximum cell synchronization error, determining a number of symbols of a partial uplink subframe (PUSF) based on the maximum cell synchronization error, and transmitting an indication of a PUSF configuration to at least one PUSF capable wireless communication device, wherein the PUSF configuration indicates the determined number of symbols of the PUSF. The method also comprises sending an uplink grant signal to one or more of the at least one PUSF capable wireless communication devices, wherein the uplink grant is for a PUSF immediately preceding another subframe to be used for downlink transmission. Transmitting the indication of the PUSF configuration may comprise broadcasting the indication or including the indication in the uplink grant signal. The method may further comprise receiving an indication of PUSF capability from the at least one PUSF capable wireless communication device, thereby identifying the at least one PUSF capable wireless communication (Continued)

device as PUSF capable. Corresponding computer program product, arrangement and network node are also disclosed.

16 Claims, 4 Drawing Sheets

(52) U.S. Cl.
CPC ... *H04W 72/1257* (2013.01); *H04W 72/1284* (2013.01); *H04W 72/1289* (2013.01)

(56) References Cited

U.S. PATENT DOCUMENTS

| | | | |
|---|---|---|---|
| 2014/0369242 A1 | 12/2014 | Ng et al. | |
| 2015/0180617 A1* | 6/2015 | Sun | H04L 1/1854 370/329 |
| 2016/0309451 A1* | 10/2016 | Ye | H04W 72/042 |
| 2017/0054546 A1* | 2/2017 | Kim | H04B 7/26 |
| 2017/0325225 A1* | 11/2017 | Dinan | H04W 72/0446 |

OTHER PUBLICATIONS

3GPP TS 36.133 V11.6.0 (Sep. 2013), 3rd Generation Partnership Project; Technical Specification Group Radio Access Network; Evolved Universal Terrestrial Radio Access (E-UTRA); Requirements for support of radio resource management (Release 11), Chapter 7.4, 2 pages.
PCT International Search Report, dated Nov. 27, 2017, in connection with International Application No. PCT/EP2017/071748, all pages.
PCT Written Opinion, dated Nov. 27, 2017, in connection with International Application No. PCT/EP2017/071748, all pages.
3GPP TSG-RAN WG1 Meeting #84, R1-160773, St. Julian's, Malta, Feb. 15-19, 2016, on LTE FS3 enhancements to support LAA UL, Nokia Networks, Alcatel-Lucent, Alcatel-Lucent Shanghai Bell, pp. 1-4.

* cited by examiner

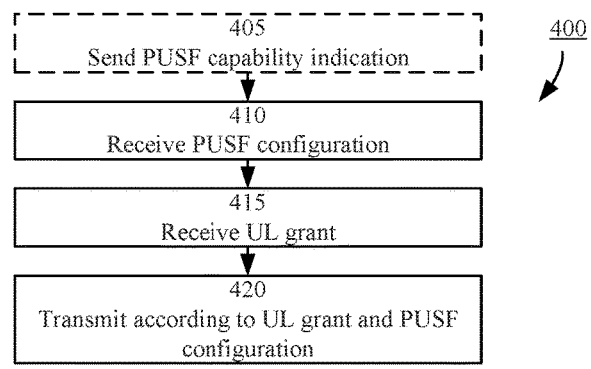
FIG. 4
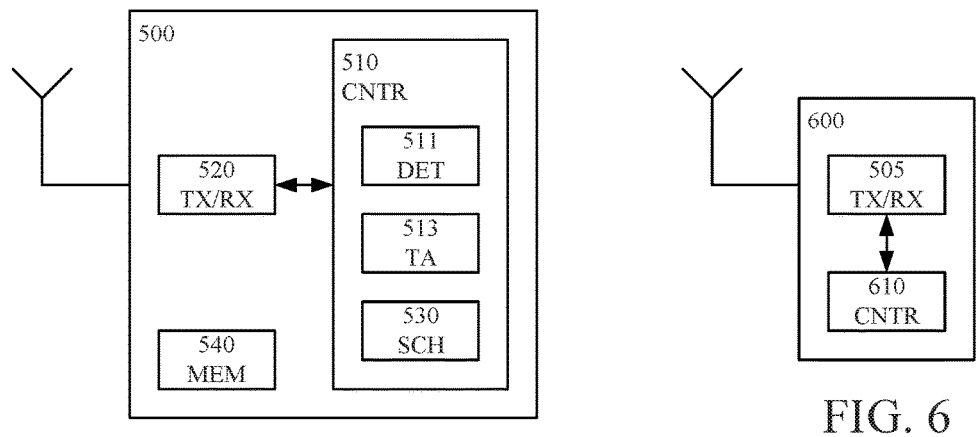
FIG. 5
FIG. 6
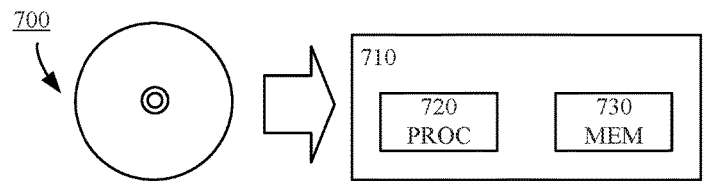
FIG. 7

NETWORK NODE OF A TIME DIVISION DUPLEX SYSTEM, AND ARRANGEMENT, METHOD, AND COMPUTER PROGRAM THEREFOR

TECHNICAL FIELD

The present invention relates generally to the field of communication systems. More particularly, it relates to switching between uplink and downlink communication in time division duplex (TDD) systems.

BACKGROUND

In time division duplex (TDD) systems, the same frequency interval may be used for both uplink and downlink transmission, wherein the uplink and downlink communication are separated in time. One example of a TDD system that will be used herein for illustrative, although not limiting, purposes is the TDD version of E-UTRA LTE (Evolved Universal Terrestrial Radio Access, Long term Evolution—advocated by 3GPP; the Third Generation Partnership Program), hereinafter LTE TDD. However, it should be noted that the problems and embodiments described herein may be equally applicable in any TDD system.

Switching between uplink and downlink (and vice versa), which may occur relatively often (e.g. one or more times during a frame in LTE TDD), may pose some problems due to, for example, propagation delay as will be illustrated in connection with FIG. 1A for a LTE TDD situation.

FIG. 1A schematically illustrates timing of uplink (UL) and downlink (DL) communication at a first network node 110 and at a first wireless communication device 100 communicating with the first network node 110. Also shown is the timing of uplink (UL) and downlink (DL) communication at a second, neighboring, network node 120 and at a second wireless communication device 130 communicating with the second network node 120.

Due to propagation delay between the network nodes and respective wireless communication devices a downlink packet transmitted by a network node arrives somewhat later at the respective wireless communication device (see, for example, downlink transmissions 111, 115, 121, 125 and corresponding downlink receptions 101, 105, 131, 135) and correspondingly for an uplink packet transmitted by a wireless communication device (see, for example, uplink transmissions 103, 104, 133, 134 and corresponding uplink receptions 113, 114, 123, 124).

To make each uplink and downlink packet fit the subframe structure (illustrated by dashed vertical lines in FIG. 1A) at each network node, a timing advance, $T_A$, 106, 136 is applied at each wireless communication device for advancing transmission of uplink packets in relation to the timing of reception of downlink packets. Typically, the network node informs the wireless communication device of which timing advance is to be used, and the timing advance corresponds to (at least) twice the propagation delay between a network node and corresponding wireless communication device to avoid overlap between uplink and downlink packets at the network node. The terms timing advance and time advance will be used interchangeably herein. The general concept of a timing advance is well known in the art and will not be elaborated on further herein. Further details may be found, for example, in "3G Evolution: HSPA and LTE for Mobile Broadband" (Chapter 16.3.5 Uplink timing advance) by Erik Dahlman, Stefan Parkvall, Johan Sköld, and Per Beming, 2007 (ISBN 978-0-12-372533-2).

To avoid overlap between downlink and uplink packets at the wireless communication device a buffer subframe 112 may be used when switching from downlink to uplink communication. In LTE TDD the buffer subframe is termed special subframe (SSF) as opposed to standard subframes (SF). As illustrated in FIG. 1A, the special subframe comprises three parts: first a downlink pilot time slot (DwPTS), in the middle a guard period (GP), and finally an uplink pilot time slot (UpPTS). The guard period should be long enough to ensure that there is no overlap between the DwPTS and the UpPTS at the wireless communication device as illustrated at 109. Generally, the buffer subframe should be constructed to avoid overlap between downlink and uplink communication at the wireless communication device, and is thereby associated with the timing advance since the timing advance and the buffer subframe together define the time between downlink and uplink communication at the wireless communication device. Since the timing advance is typically (essentially) proportional to the propagation delay, large cells typically require a longer guard period than small cells.

Generally, the length of the guard period of the buffer subframe and the length of the timing advance may depend on other factors as well. For example, the necessary time for circuitry in the network node and wireless communication device, respectively, to switch between uplink and downlink communication (and vice versa) may be taken into account. However, circuitry switching is typically relatively fast compared to other components such as propagation delay.

Another example of factors that may affect the length of the guard period and the length of the timing advance is interference between cells (e.g. from neighboring network nodes or from wireless communication devices communicating with neighboring network nodes). Such interference between downlink and uplink communication may originate from the fact that the propagation delay is typically longer for signals from neighboring cells than for signals from the own cell.

Alternatively, or additionally, such interference may arise if the network nodes are not fully synchronized in time. This is illustrated in FIG. 1A where a cell synchronization error 117 between network nodes 110 and 120 results in an overlap (a collision) 118, 128 between downlink and uplink communication at the respective network nodes. Thus, 128 illustrates that when network node 120 is to receive UL packet 124 it will be interfered by transmission by the network node 110 of DL packet 115. Similarly, 118 illustrates that when DL packet 115 transmitted by network node 110 is to be received as DL packet 105, it may be interfered by UL packet 124 transmitted by wireless communication device 130 as UL packet 134.

To avoid this type of interference, TDD systems typically specify tight synchronization between network nodes. For example, 3GPP Technical Specification (TS) 36.133 (v. 11.6.0 (2013-09), 3rd Generation Partnership Project; Evolved Universal Terrestrial Radio Access (E-UTRA); Requirements for support of radio resource management) specifies cell phase synchronization requirements for LTE TDD (see e.g. tables 7.4.2-1 and 7.4.2-2). Examples of how tight synchronization may be achieved include using a GNSS (global navigation satellite system) receiver to derive accurate timing from satellite signals and/or using synchronization protocols (e.g. Precision Time Protocol, PTP, IEEE 1588) to distribute time from an accurate time source.

However, in some situations it may be desirable to compromise the tight synchronization requirements. For example, for indoor communication systems it may be unnecessarily costly to deploy either of the GNSS solution and the synchronization protocol solution. In fact, these solutions may, sometimes, be impossible to implement due to, for example, restrictions related to the building. Thus, it may be desired to use a loosely synchronized system, for example, with Network Time Protocol (NTP) which implicates lower synchronization accuracy.

Therefore, there is a need for approaches to avoid, or at least reduce, interference between cells when neighboring network nodes are not tightly synchronized in time.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to solve or mitigate at least some of the above or other disadvantages.

According to a first aspect, this is achieved by a method of a network node of a time division duplex (TDD) system.

The method comprises acquiring a maximum cell synchronization error, determining a number of symbols of a partial uplink subframe (PUSF) based on the maximum cell synchronization error, and transmitting an indication of a PUSF configuration to at least one PUSF capable wireless communication device, wherein the PUSF configuration indicates the determined number of symbols of the PUSF.

The method also comprises sending an uplink grant signal to one or more of the at least one PUSF capable wireless communication devices, wherein the uplink grant is for a PUSF immediately preceding another subframe to be used for downlink transmission.

The TDD system may be experiencing large synchronization error (low synchronization accuracy) between network nodes, either because synchronization accuracy is relaxed in the system or because a synchronization source of the system is temporarily unavailable, for example.

In some embodiments, the maximum cell synchronization error may be a maximum cell synchronization error between a cell of the network node and all cells of network nodes in a set of neighboring network nodes.

According to some embodiments, determining a number of symbols of a partial uplink subframe (PUSF) based on the maximum cell synchronization error may comprise determining the number of symbols as an integer part of a ratio between a difference between a subframe duration, $T_{SF}$, and the maximum cell synchronization error, $e_{max}$, and a symbol duration, $T_S$; $\lfloor (T_{SF}-e_{max})/T_s \rfloor$.

Sending, to one or more of the at least one PUSF capable wireless communication devices, an uplink grant for a PUSF immediately preceding another subframe to be used for downlink transmission may, in some embodiments, comprise granting only PUSF capable wireless communication devices in the PUSF immediately preceding the another subframe to be used for downlink transmission.

Transmitting the indication of the PUSF configuration may, according to various embodiments, comprise broadcasting the indication or including the indication in the uplink grant signal.

In some embodiments, the method may further comprise (for each PUSF capable wireless communication device to be sent the uplink grant for the PUSF immediately preceding the subframe to be used for downlink transmission, and after the step of acquiring the maximum cell synchronization error) determining whether twice a sum of the maximum cell synchronization error and the propagation delay between the network node and the PUSF capable wireless communication device is below a time advance threshold. (It may be noted that an equally valid test comprises determining whether a sum of the maximum cell synchronization error and the propagation delay between the network node and the PUSF capable wireless communication device is below a time advance threshold scaled by 0.5.)

If so, the method may also comprise postponing the steps of determining the number of symbols of the PUSF and transmitting the indication of the PUSF configuration until twice a sum of an updated maximum cell synchronization error and the propagation delay is above the time advance threshold, and increasing a time advance of the PUSF capable wireless communication device, wherein the increase is associated with the maximum cell synchronization error.

For example, the increase may be equal to the maximum cell synchronization error times a scaling factor. The scaling factor may, for example, be equal to 2 in some embodiments.

According to some embodiments, the time advance threshold may be based on one or more of a guard period of a buffer subframe of the TDD system, a transceiver circuit switching time, a propagation delay between interfering network nodes and the network node, an attenuation between the interfering (e.g. neighboring) network nodes and the (serving) network node, and a comparison between an amount of interference (e.g. measured UL interference) in a first uplink subframe and in a second uplink subframe wherein the first uplink subframe is immediately subsequent to the buffer subframe. The buffer subframe may, for example, be a special subframe.

The method may, in some embodiments, further comprise (if twice the sum of the maximum cell synchronization error and the propagation delay is above the time advance threshold) increasing the time advance of the PUSF capable wireless communication device to (for example) a maximum time advance, and determining the number of symbols of the PUSF further based on the increase of the time advance. For example, the number of symbols of the PUSF may be determined as $\lfloor (T_{SF}-e_{max}+\Delta T_A)/T_s \rfloor$, where $\Delta T_A$ denotes the increase of the time advance. The increased time advance may be less than or may equal a maximum possible time advance. The increase may, for example, be determined so that (at the wireless communication device) the gap between DL and UL communication formed by the guard period (including none or one or more of the DwPTS and the UpPTS) minus the time advance and the gap between UL and DL communication formed by the silent period of the PUSF plus the time advance are (substantially) equal.

According to some embodiments, the method may further comprise (after the step of acquiring the maximum cell synchronization error) determining whether the maximum cell synchronization error is below a cell synchronization error threshold, and if so postponing the steps of determining the number of symbols of the PUSF and transmitting the indication of the PUSF configuration until an updated maximum cell synchronization error is above the cell synchronization error threshold.

The cell synchronization error threshold may, for example, correspond to a cell synchronization requirement of the TDD system.

In some embodiments, the cell synchronization error threshold may be lower than the time advance threshold divided by two, minus the propagation delay.

The method may further comprise receiving an indication of PUSF capability from the at least one PUSF capable wireless communication device in some embodiments, thereby identifying the at least one PUSF capable wireless communication device as PUSF capable.

The method may, in some embodiments, further comprise determining an uplink transmission format based on the determined number of symbols of the PUSF. The PUSF configuration may further indicate the determined uplink transmission format.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect is an arrangement for a network node of a time division duplex (TDD) system. The arrangement comprises a controller adapted to cause acquisition (e.g. by a receiver or by retrieving from a memory or register) of a maximum cell synchronization error, determination (e.g. by a determiner) of a number of symbols of a partial uplink subframe (PUSF) based on the maximum cell synchronization error, and transmission (e.g. by a transmitter) of an indication of a PUSF configuration to at least one PUSF capable wireless communication device, wherein the PUSF configuration indicates the determined number of symbols of the PUSF. The controller is also adapted to cause sending (e.g. by a transmitter, possibly in cooperation with a scheduler) of an uplink grant signal to one or more of the at least one PUSF capable wireless communication devices, wherein the uplink grant is for a PUSF immediately preceding another subframe to be used for downlink transmission.

In some embodiments, the controller may be further adapted to cause (for each PUSF capable wireless communication device to be sent the uplink grant for the PUSF immediately preceding the subframe to be used for downlink transmission, and after acquisition of the maximum cell synchronization error) determination (e.g. by a determiner, which may be same as or different from the determiner determining the number of symbols of the PUSF) of whether twice a sum of the maximum cell synchronization error and the propagation delay between the network node and the PUSF capable wireless communication device is below a time advance threshold.

If so, the controller may also be adapted to cause postponement of the determination of the number of symbols of the PUSF and the transmission the indication of the PUSF configuration until twice a sum of an updated maximum cell synchronization error and the propagation delay is above the time advance threshold, and increase (e.g. by a time advance unit in cooperation with a transmitter) of a time advance of the PUSF capable wireless communication device, wherein the increase is associated with the maximum cell synchronization error.

A fourth aspect is a network node comprising the arrangement according to the third aspect.

A related method may also be mentioned, of a partial uplink subframe (PUSF) capable wireless communication device connectable to a network node of a time division duplex (TDD) system.

The method comprises receiving an indication of a PUSF configuration from the network node, wherein the PUSF configuration indicates a number of symbols of a PUSF, the number of symbols determined by the network node based on a maximum cell synchronization error, receiving an uplink grant signal from the network node, wherein the uplink grant is for a PUSF immediately preceding another subframe to be used for downlink transmission, and transmitting according to the received PUSF configuration and the PUSF of the uplink grant signal.

The method may possibly further comprise transmitting an indication of PUSF capability to the network node. Such indication may, for example, be performed in connection with a registration signaling, or at any other suitable time.

A related arrangement may also be mentioned, for a partial uplink subframe (PUSF) capable wireless communication device connectable to a network node of a time division duplex (TDD) system.

The arrangement comprises a controller adapted to cause reception of an indication of a PUSF configuration from the network node, wherein the PUSF configuration indicates a number of symbols of a PUSF, the number of symbols determined by the network node based on a maximum cell synchronization error, reception of an uplink grant signal from the network node, wherein the uplink grant is for a PUSF immediately preceding another subframe to be used for downlink transmission, and transmission according to the received PUSF configuration and the PUSF of the uplink grant signal.

A partial uplink subframe (PUSF) capable wireless communication device may comprise the related arrangement.

In some embodiments, any of the above aspects may additionally have features identical with or corresponding to any of the various features as explained above for any of the other aspects.

An advantage of some embodiments is that interference between cells when neighboring network nodes are not tightly synchronized in time may be avoided, or at least reduced.

Another advantage of some embodiments is that use of TDD system deployments with lower cell synchronization accuracy may be enabled. This may reduce deployment cost.

BRIEF DESCRIPTION OF THE DRAWINGS

Further objects, features and advantages will appear from the following detailed description of embodiments, with reference being made to the accompanying drawings, in which:

FIG. 4 is a flowchart illustrating example method steps according to some embodiments;

FIG. 5 is a schematic block diagram illustrating an example arrangement according to some embodiments;

FIG. 6 is a schematic block diagram illustrating an example arrangement according to some embodiments; and FIG. 7 is a schematic drawing illustrating a computer readable medium according to some embodiments.

DETAILED DESCRIPTION

In the following, embodiments will be described which are applicable to TDD systems in general. Embodiments may be particularly applicable to, for example, TDD systems with a relaxed cell synchronization requirement. Alternatively or additionally, embodiments maybe particularly applicable to, for example, (synchronous) TDD systems with a risk of temporary unavailability of a synchronization source (e.g. a time reference provider). In the latter case, the cell timing may drift to a certain extent compared to a reference clock.

Figure 1A:
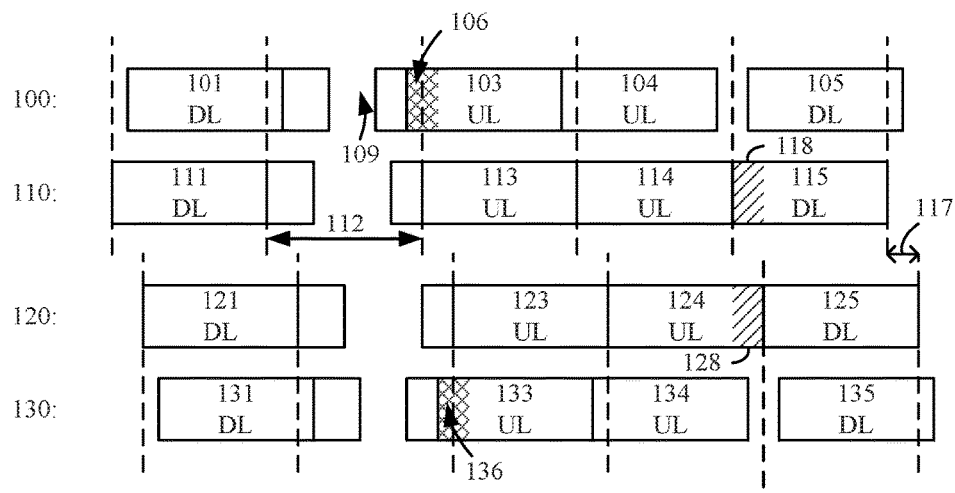
FIGS. 1A-D are schematic drawings illustrating timing of subframes in various situations according to some embodiments.
Figure 1B:
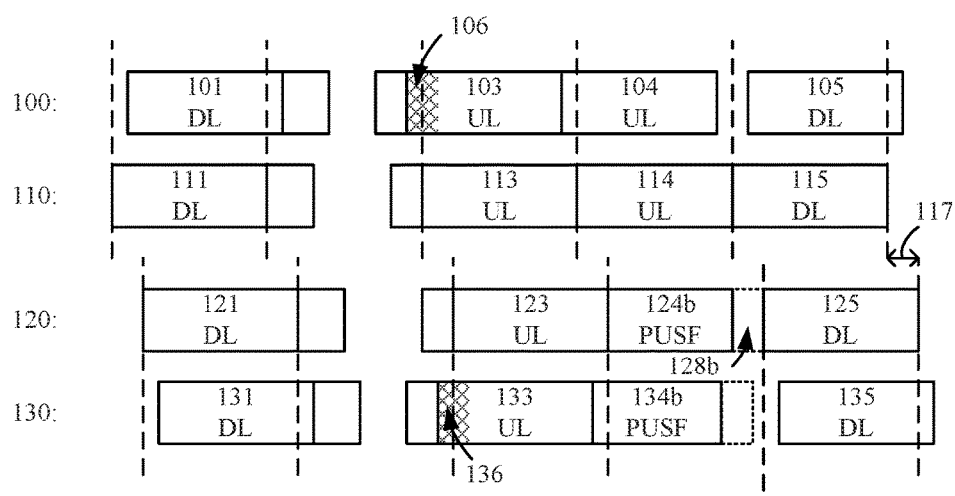
Figure 1C:
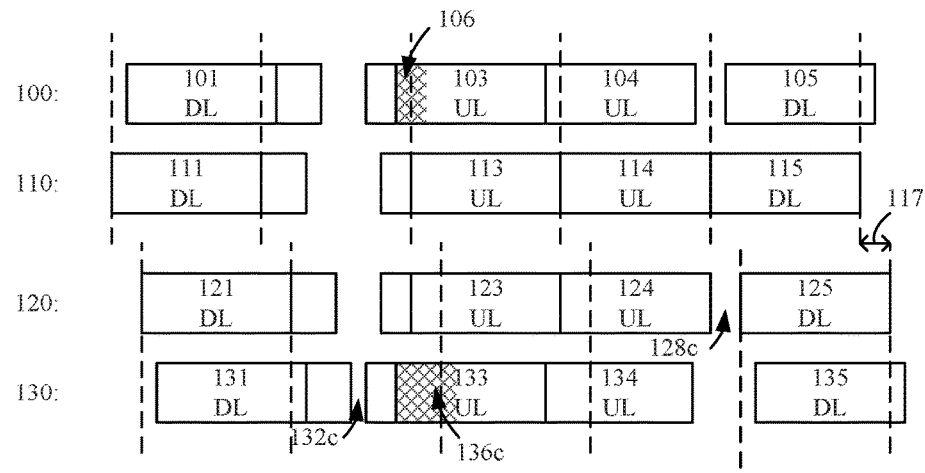
Figure 1D:
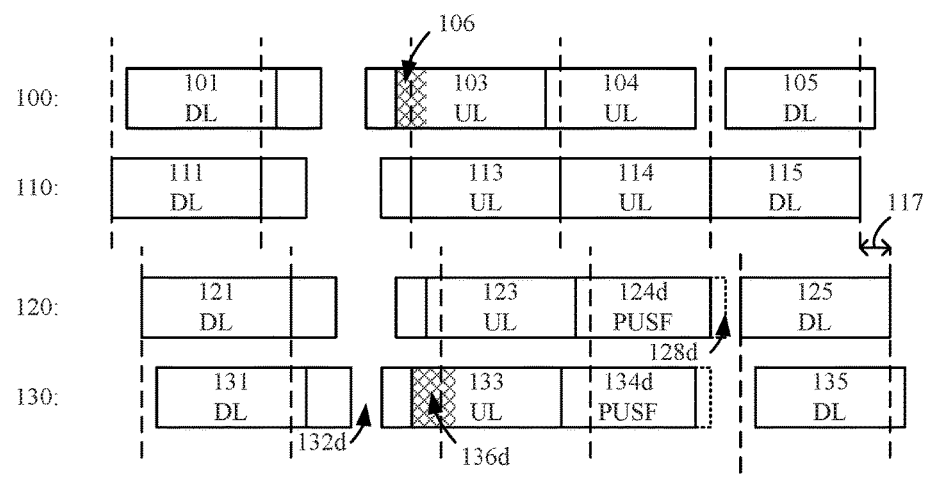

FIGS. 1B, 1C and 1D illustrate some example approaches that strive to avoid, or at least reduce, interference between cells when neighboring network nodes are not tightly synchronized in time. Reference numbers that coincide with those of FIG. 1A denote corresponding features and will not be elaborated on further.

In FIG. 1B, it can be seen that the UL subframe 134, 124 of FIG. 1A has been replaced by a shorter version—a partial uplink subframe (PUSF), 134b, 124b. To be able to avoid the overlapping problem illustrated by 128, 118 in FIG. 1A (i.e. to create a long enough silent period 128b between UL and DL communication), the difference in length between a normal subframe and the PUSF should be at least as long as the cell synchronization error 117 in this example. A possible approach is to configure the PUSF such that this difference is equal to or larger than a maximum cell synchronization error.

In FIG. 1C, it can be seen that the timing advance 136 of FIG. 1A has been replaced by a longer version 136c. To be able to avoid the overlapping problem illustrated by 128, 118 in FIG. 1A (i.e. to create a long enough silent period 128c between UL and DL communication), the timing advance 136c should be increased (compared to the timing advance 136 of FIG. 1A) by at least the cell synchronization error 117 in this example. A possible approach is to increase the timing advance by an amount that is equal to or larger than a maximum cell synchronization error. Of course, this approach results in a smaller guard period 132c, and an upper limit to how much the timing advance may be increased is set by the fact that the guard period cannot take a negative number.

The approach illustrated in FIG. 1D can be seen as a combination of those of FIGS. 1B and 1C. In FIG. 1D, it can be seen that the UL subframe 134, 124 of FIG. 1A has been replaced by a shorter version—a partial uplink subframe (PUSF), 134d, 124d, and that the timing advance 136 of FIG. 1A has been replaced by a longer version 136d. To be able to avoid the overlapping problem illustrated by 128, 118 in FIG. 1A (i.e. to create a long enough silent period 128d between UL and DL communication), the timing advance increase plus the difference in length between a normal subframe and the PUSF should be at least as long as the cell synchronization error 117 in this example. A possible approach is to configure the PUSF and the timing advance such that the difference plus the increase is equal to or larger than a maximum cell synchronization error. For example, a partition between the difference and the increase may be made such that the silent period 128d and the guard period 132d are (approximately) equal. As in the example of FIG. 1C, an upper limit to how much the timing advance may be increased is set by the fact that the guard period 132d cannot take a negative number.

The maximum cell synchronization error may, for example, be a maximum cell synchronization error of the entire TDD system, or a maximum cell synchronization error between neighboring network nodes.

In the examples of FIGS. 1B-D the adjustments of PUSF and/or timing advance are only illustrated in relation to the second network node 120 and the second wireless communication device 130. However, in the general case the sign of the cell synchronization error 117 is typically not known. Therefore, similar adjustments (of PUSF and/or timing advance) are typically applied to all cells under consideration, i.e. also in relation to the first network node 110 and the first wireless communication device 100 in the example of FIGS. 1B-D.

Figure 2:
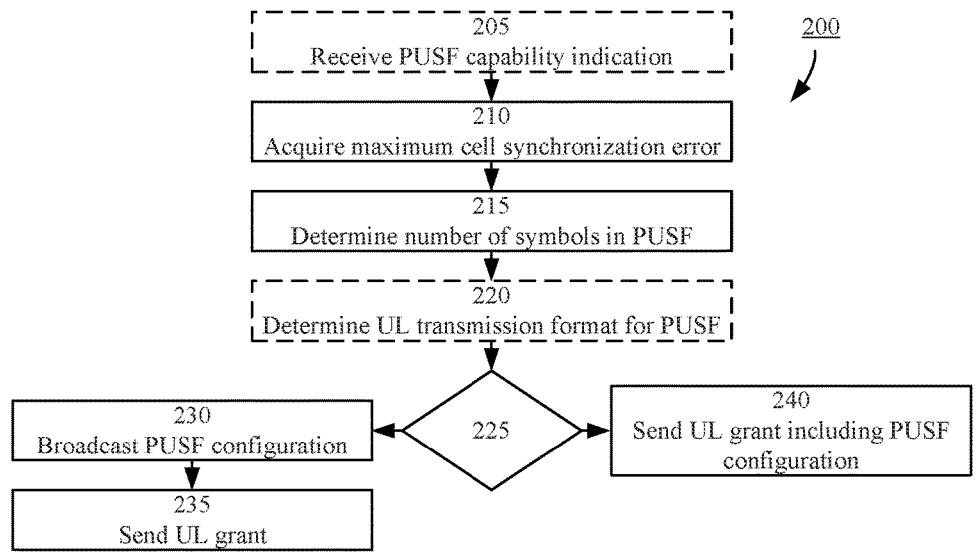
FIG. 2 is a flowchart illustrating example method steps according to some embodiments.

FIG. 2 illustrates an example method 200 according to some embodiments, which may be performed by a network node of a time division duplex (TDD) system. The example method 200 may produce the example situation described in connection with FIG. 1B.

The method starts in optional step 205, where an indication of PUSF capability is received from at least one PUSF capable wireless communication device, thereby identifying the at least one PUSF capable wireless communication device as PUSF capable.

A maximum cell synchronization error is acquired in step 210. The maximum cell synchronization error may, for example, be a maximum cell synchronization error between a cell of the network node and all cells of network nodes in a set of neighboring network nodes, or a maximum cell synchronization of the entire TDD system.

Acquiring the maximum cell synchronization error may be performed in any suitable way. It may already be known to the network node and acquiring may comprise retrieving it from its storage (a memory, register or similar). Alternatively or additionally, it may be received from a network server (or similar apparatus) or from one or more wireless communication devices (e.g. in the form of measurement reports). Yet alternatively or additionally, it may be deduced (e.g. estimated) from statistics of receptions from a network server (or similar apparatus) or from measurements communicated by one or more wireless communication devices (e.g. in the form of reports).

Examples of acquisition of the maximum cell synchronization error include:
- Receiving configuration of the maximum cell synchronization error that is determined by the type of timing reference applied by the TDD system. For example, in the Precision Time Protocol (PTP) the accuracy, and thereby the maximum cell synchronization error, is given by the PTP profile.
- Receiving configuration of the maximum cell synchronization error that is measured by equipment that has an absolute reference time (e.g. using GNSS).
- Deriving the maximum cell synchronization error by measuring the timing of cells provided by neighboring network nodes and finding the largest difference compared to the timing of the cell(s) provided by the network node itself.
- Deriving the maximum cell synchronization error by measuring, with the assistance of wireless communication devices (e.g. user equipment, UE), the timing of cells provided by neighboring network nodes. The wireless communication devices may be configured to perform neighboring cell measurements and report a timing difference between measured cells.

Optionally, it may be determined in step 210 whether the maximum cell synchronization error is below a cell synchronization error threshold (e.g. corresponding to a cell synchronization requirement of the TDD system), and if so the method may linger in step 210 until updated maximum cell synchronization error is above the cell synchronization error threshold. This has the benefit that PUSF and/or increased timing advance is not applied if a (tight) cell synchronization requirement of the TDD system is already met.

A number of symbols of a partial uplink subframe (PUSF) is determined in step 215 based on the maximum cell synchronization error. For example, the number of symbols may be determined as $\lfloor (T_{SF}-e_{max})/T_s \rfloor$, where $T_{SF}$ denotes the subframe duration $e_{max}$ denotes the maximum cell synchronization error, and $T_s$ denotes the symbol duration.

In optional step 220, an uplink transmission format for the PUSF is determined based on the determined number of symbols of the PUSF.

According to the method an indication of a PUSF configuration is transmitted to at least one PUSF capable wireless communication device (e.g. one of those identified in step 205). The PUSF configuration indicates the number of symbols of the PUSF determined in step 215 and (optionally) the uplink transmission format determined in step 220. In the example of FIG. 2 the transmission of the indication may be made according to any of two different approaches as illustrated by selection step 225. Of course, various implementations may allow only the first approach, only the second approach, or both approaches.

In the first approach, the indication of the PUSF configuration is transmitted via broadcast (thus available to, and equal for, all PUSF capable wireless communication devices of the cell) as illustrated in step 230. Then, an uplink grant signal is sent to one or more of the at least one PUSF capable wireless communication devices in step 235, wherein the uplink grant is for a PUSF immediately preceding another subframe to be used for downlink transmission.

In the second approach, the indication of the PUSF configuration is transmitted by inclusion in the uplink signal grant signal sent to one or more of the at least one PUSF capable wireless communication devices (thus available to, and possible different for, each granted PUSF capable wireless communication device) as illustrated in step 240. As in step 235, the uplink grant is for a PUSF immediately preceding another subframe to be used for downlink transmission.

Typically, but not necessarily, UL grants (steps 235 and 240) for a subframe where the PUSF is to be transmitted (the one immediately preceding another subframe to be used for downlink transmission) are sent only to PUSF capable wireless communication devices.

Figure 3:
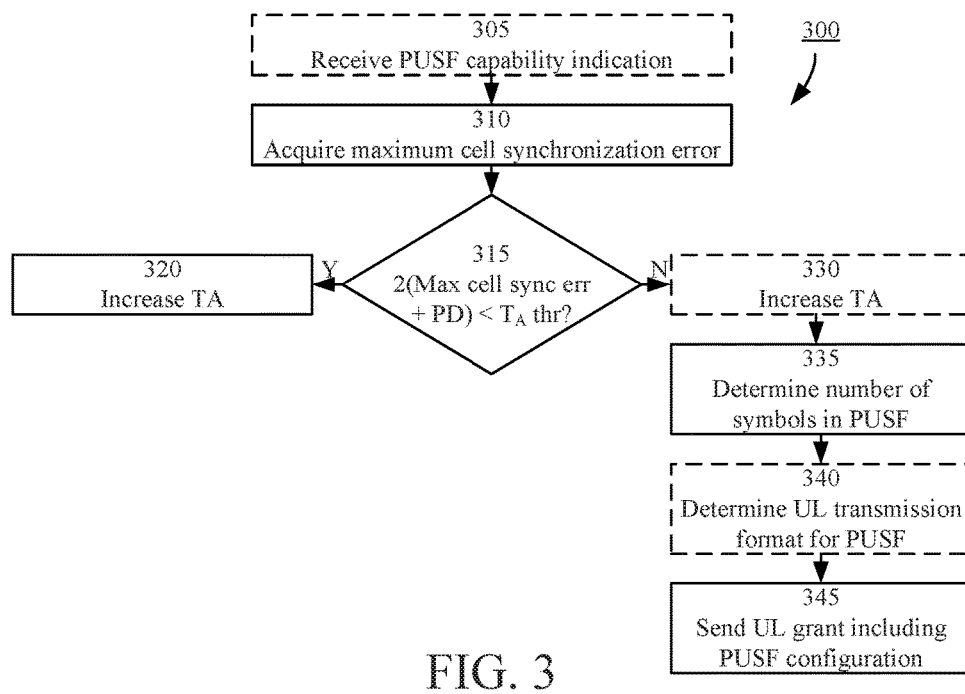
FIG. 3 is a flowchart illustrating example method steps according to some embodiments.

FIG. 3 illustrates an example method 300 according to some embodiments, which may be performed by a network node of a time division duplex (TDD) system. The example method 300 may produce the example situations described in connection with FIG. 1C and/or FIG. 1D.

The method starts in optional step 305 (compare with 205), where an indication of PUSF capability is received from at least one PUSF capable wireless communication device.

A maximum cell synchronization error is acquired in step 310 (compare with 210). The maximum cell synchronization error may, for example, be a maximum cell synchronization error between a cell of the network node and all cells of network nodes in a set of neighboring network nodes, or a maximum cell synchronization of the entire TDD system. As described an exemplified in connection with FIG. 2, acquiring the maximum cell synchronization error may be performed in any suitable way.

Optionally, it may be determined in step 310 whether the maximum cell synchronization error is below a cell synchronization error threshold, and if so the method may linger in step 310 until updated maximum cell synchronization error is above the cell synchronization error threshold.

In step 315, it is determined whether twice the sum of the maximum cell synchronization error and the propagation delay (PD) between the network node and the PUSF capable wireless communication device is below a time advance threshold. The yes-path (Y) out of step 315 may produce the example situation described in connection with FIG. 1C and the no-path (N) out of step 315 may produce the example situation described in connection with FIG. 1D.

The time advance threshold is typically chosen such that the yes-path (Y) out of step 315 is taken if an increased timing advance is sufficient to accommodate the maximum cell synchronization error and the no-path (N) out of step 315 is taken if an increased timing advance is not sufficient to accommodate the maximum cell synchronization error.

The possibility to accommodate the maximum cell synchronization error may be limited by the fact that the guard period cannot be smaller than zero (compare with 132c and 132d) and possibly also by a requirement that the silent period between PUSF and the subsequent DL packet (compare with 128c, 128d) and the guard period in a switch from DL to UL (compare with 132c, 132d) should be (approximately) equal.

Alternatively or additionally, the time advance threshold may be based on one or more of a guard period of a buffer subframe of the TDD system, a transceiver circuit switching time, a propagation delay between interfering network nodes and the network node, an attenuation between the interfering (e.g. neighboring) network nodes and the (serving) network node, and a comparison between an amount of interference (e.g. measured UL interference) in a first uplink subframe and in a second uplink subframe wherein the first uplink subframe is immediately subsequent to the buffer subframe.

If twice the sum of the maximum cell synchronization error and the propagation delay is below the time advance threshold (yes-path out of step 315), the timing advance is increased in step 320 to accommodate the cell synchronization error and no PUSF is configured at that point.

The increase is associated with the maximum cell synchronization error as exemplified in connection with FIG. 1C. For example, the increase may be equal to the maximum cell synchronization error times a scaling factor. The scaling factor may be a number between 1 and 2 (for example equal to 1 or equal to 2).

If twice the sum of the maximum cell synchronization error and the propagation delay is not below the time advance threshold (no-path out of step 315), the timing advance may be increased in step 330 to accommodate part of the cell synchronization error. This option may produce the example situation described in connection with FIG. 1D.

The increase may, for example, be such that a maximum possible timing advance is applied. A maximum possible timing advance may be determined by the fact that the guard period cannot be smaller than zero and/or by a requirement that the silent period in a switch from UL to DL and the guard period in a switch from DL to UL should be (approximately) equal.

Regardless of whether or not a timing advance increase is applied in step 330, a number of symbols of a partial uplink subframe (PUSF) is determined in step 335 based on the maximum cell synchronization error (compare with 215). For example, the number of symbols may be determined as $\lfloor (T_{SF}-e_{max})/T_s \rfloor$ if no timing advance increase is applied, where $T_{SF}$ denotes the subframe duration $e_{max}$ denotes the maximum cell synchronization error, and $T_s$ denotes the symbol duration. If timing advance increase $\Delta T_A$ is applied, the number of symbols may be determined as $\lfloor (T_{SF} - e_{max} + \Delta T_A)/T_s \rfloor$, for example.

In optional step 340, an uplink transmission format for the PUSF is determined based on the determined number of symbols of the PUSF (compare with 220).

In step 345 (compare with 240), an indication of a PUSF configuration is transmitted to at least one PUSF capable wireless communication device (e.g. one of those identified in step 305) by inclusion in an uplink signal grant signal. The uplink grant is for a PUSF immediately preceding another subframe to be used for downlink transmission. The PUSF configuration indicates the number of symbols of the PUSF determined in step 335 and (optionally) the uplink transmission format determined in step 340. In some embodiments, the uplink signal grant signal may also comprise the time advance increase determined in step 330.

FIG. 4 illustrates an example method 400, which may be performed by a PUSF capable wireless communication device connectable to a network node of a time division duplex (TDD) system.

In optional step 405 an indication of PUSF capability is transmitted to the network node (compare with 205, 305). An indication of a PUSF configuration and an UL grant signal are received from the network node in steps 410 and 415 (compare with 230, 235, 240, 345). As explained earlier, the indication may be broadcast or may be included in the UL grant signal. In step 420, transmission is performed according to the received PUSF configuration and the uplink grant signal.

FIG. 5 schematically illustrates an example arrangement 500 for a network node of a time division duplex (TDD) system according to some embodiments. The arrangement 500 may be adapted to perform (or at least cause performance of), for example, method steps of any of the methods described in connection with FIGS. 2 and 3.

The arrangement comprises a controller (CNTR) 510. A transceiver (TX/RX) 520 is either associated with or comprised in the arrangement.

The controller is adapted to cause acquisition of a maximum cell synchronization error (compare with 210, 310). As exemplified above, acquisition may, for example, be performed by reception (via the transceiver) or by retrieving from a storage (MEM) 540 associated with or comprised in the arrangement.

The controller is also adapted to cause determination of a number of symbols of a partial uplink subframe (PUSF) based on the maximum cell synchronization error (compare with 215, 335). A determiner (DET) 511 may be comprised in (or associated with) the controller for this purpose.

The controller is also adapted to cause (by the transceiver) transmission of an indication of a PUSF configuration and sending of an uplink grant signal to PUSF capable wireless communication devices as explained above. A scheduler (SCH) 530 may be comprised in (or associated with) the controller for the purpose of scheduling uplink grants.

Further, the controller may be adapted to cause determination of whether twice the sum of the maximum cell synchronization error and the propagation delay is below a time advance threshold. A determiner may be comprised in (or associated with) the controller for this purpose. This determiner may be the same as or different from the determiner 511.

The controller may also be adapted to cause an increase of the time advance as explained above. A time advance unit (TA) 513 may be comprised in (or associated with) the controller for the purpose of keeping track of current time advance values for different wireless communication devices, and the increase may be communicated to the relevant wireless communication device via the transceiver.

FIG. 6 schematically illustrates an example arrangement 600 for a partial uplink subframe (PUSF) capable wireless communication device connectable to a network node of a time division duplex (TDD) system. The arrangement 600 may be adapted to perform (or at least cause performance of), for example, method steps of the method described in connection with FIG. 4.

The arrangement comprises a controller adapted to cause reception of an indication of a PUSF configuration from the network node, reception of an uplink grant signal from the network node, and transmission according to the received PUSF configuration and the PUSF of the uplink grant signal as described above.

Thus, according to some embodiments a method is introduced to accommodate a cell synchronization error. The method creates a silent period in the end of a partial UL subframe (PUSF) when switching from UL to DL by discarding one or more symbols at the end of the UL subframe. In some embodiments, PUSF may be applied in combination with an increased timing advance to accommodate a cell synchronization error. In some situations, using an increased timing advance may suffice to accommodate a cell synchronization error. An advantage of this embodiment is low realization complexity.

The transmission format (e.g. Modulation and Coding Scheme, MCS) for each PUSF may be determined based on the number of symbols in PUSF.

The synchronization accuracy (i.e. the maximum cell synchronization error) may be known to the network node in some network deployment scenarios (e.g. when a network node such as an eNB gets a timing reference from a local NTP server). Alternatively or additionally, the synchronization accuracy may be derived from a latency variation of NTP packets. Yet, alternatively or additionally, the network node may obtain knowledge of the synchronization accuracy via UE measurement reports comprising an indication of a timing difference in relation to neighboring network nodes.

The PUSF configuration can be signaled to wireless communication devices (e.g. UE) via broadcast information or via dedicated signaling (e.g. UL grant). Thus, the PUSF configuration can be broadcasted in the cell enabling that all PUSF capable devices applies the determined PUSF. Alternatively or additionally, the PUSF configuration may be indicated in the UL grant. The network node may see to that only PUSF capable devices are scheduled and granted UL resources in the relevant subframe.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device or a network node) comprising arrangements/circuitry/logic or performing methods according to any of the embodiments.

According to some embodiments, a computer program product comprises a computer readable medium such as, for example, a USB-stick, a plug-in card, an embedded drive, or a read-only memory (ROM) such as the CD-ROM 700 illustrated in FIG. 7. The computer readable medium may have stored thereon a computer program comprising program instructions. The computer program may be loadable into a data-processing unit (PROC) 720, which may, for example, be comprised in a network node 710. When loaded into the data-processing unit, the computer program may be stored in a memory (MEM) 730 associated with or integral to the data-processing unit. According to some embodiments, the computer program may, when loaded into and run by the data-processing unit, cause execution of method steps according to, for example, the methods shown in any of the FIGS. 2-3.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a network node of a time division duplex (TDD) system, the method comprising:
   acquiring a maximum cell synchronization error;
   determining a number of symbols of a partial uplink subframe (PUSF) based on the maximum cell synchronization error;
   transmitting an indication of a PUSF configuration to at least one PUSF capable wireless communication device, wherein the PUSF configuration indicates the determined number of symbols of the PUSF; and
   sending an uplink grant signal to one or more of the at least one PUSF capable wireless communication devices, wherein the uplink grant is for a PUSF immediately preceding another subframe to be used for downlink transmission.

2. The method of claim 1 wherein transmitting the indication of the PUSF configuration comprises broadcasting the indication.

3. The method of claim 1 wherein transmitting the indication of the PUSF configuration comprises including the indication in the uplink grant signal.

4. The method of claim 3 further comprising, for each PUSF capable wireless communication device to be sent the uplink grant for the PUSF immediately preceding the subframe to be used for downlink transmission, and after the step of acquiring the maximum cell synchronization error:
   determining whether twice a sum of the maximum cell synchronization error and the propagation delay between the network node and the PUSF capable wireless communication device is below a time advance threshold; and if so
   postponing the steps of determining the number of symbols of the PUSF and transmitting the indication of the PUSF configuration until twice a sum of an updated maximum cell synchronization error and the propagation delay is above the time advance threshold; and
   increasing a time advance of the PUSF capable wireless communication device, wherein the increase is associated with the maximum cell synchronization error.

5. The method of claim 4 wherein the time advance threshold is based on one or more of a guard period of a buffer subframe of the TDD system, a transceiver circuit switching time, a propagation delay between interfering network nodes and the network node, an attenuation between the interfering network nodes and the network node, and a comparison between an amount of interference in a first uplink subframe and in a second uplink subframe wherein the first uplink subframe is immediately subsequent to the buffer subframe.

6. The method of claim 4 further comprising, if twice the sum of the maximum cell synchronization error and the propagation delay is above the time advance threshold:
   increasing the time advance of the PUSF capable wireless communication device to a maximum time advance; and
   determining the number of symbols of the PUSF further based on the increase of the time advance.

7. The method of claim 1 further comprising receiving an indication of PUSF capability from the at least one PUSF capable wireless communication device, thereby identifying the at least one PUSF capable wireless communication device as PUSF capable.

8. The method of claim 1 further comprising determining an uplink transmission format based on the determined number of symbols of the PUSF, the PUSF configuration further indicating the determined uplink transmission format.

9. A nontransitory computer readable storage medium, having thereon a computer program comprising program instructions, the computer program being loadable into a data-processing unit and adapted to cause execution of a method of a network node of a time division duplex (TDD) system when the computer program is run by the data-processing unit, wherein the method comprises:
   acquiring a maximum cell synchronization error;
   determining a number of symbols of a partial uplink subframe (PUSF) based on the maximum cell synchronization error;
   transmitting an indication of a PUSF configuration to at least one PUSF capable wireless communication device, wherein the PUSF configuration indicates the determined number of symbols of the PUSF; and
   sending an uplink grant signal to one or more of the at least one PUSF capable wireless communication devices, wherein the uplink grant is for a PUSF immediately preceding another subframe to be used for downlink transmission.

10. An arrangement for a network node of a time division duplex (TDD) system, the arrangement comprising a controller adapted to cause:
    acquisition of a maximum cell synchronization error;
    determination of a number of symbols of a partial uplink subframe (PUSF) based on the maximum cell synchronization error;

transmission of an indication of a PUSF configuration to at least one PUSF capable wireless communication device, wherein the PUSF configuration indicates the determined number of symbols of the PUSF; and sending of an uplink grant signal to one or more of the at least one PUSF capable wireless communication devices, wherein the uplink grant is for a PUSF immediately preceding another subframe to be used for downlink transmission.

11. The arrangement of claim 10 wherein the controller is adapted to cause the transmission of the indication of the PUSF configuration by broadcast of the indication.

12. The arrangement of claim 10 wherein the controller is adapted to cause the transmission of the indication of the PUSF configuration by inclusion of the indication in the uplink grant signal.

13. The arrangement of claim 12 wherein the controller is further adapted to cause, for each PUSF capable wireless communication device to be sent the uplink grant for the PUSF immediately preceding the subframe to be used for downlink transmission, and after acquisition of the maximum cell synchronization error:

determination of whether twice a sum of the maximum cell synchronization error and the propagation delay between the network node and the PUSF capable wireless communication device is below a time advance threshold; and if so postponement of the determination of the number of symbols of the PUSF and the transmission the indication of the PUSF configuration until twice a sum of an updated maximum cell synchronization error and the propagation delay is above the time advance threshold; and increase of a time advance of the PUSF capable wireless communication device, wherein the increase is associated with the maximum cell synchronization error.

14. The arrangement of claim 13 wherein the controller is further adapted to cause, if twice the sum of the maximum cell synchronization error and the propagation delay is above the time advance threshold:

increase of the time advance of the PUSF capable wireless communication device to a maximum time advance; and determination of the number of symbols of the PUSF based further on the increase of the time advance.

15. The arrangement of claim 10 wherein the controller is further adapted to cause determination of an uplink transmission format based on the determined number of symbols of the PUSF, the PUSF configuration further indicating the determined uplink transmission format.

16. A network node comprising the arrangement according to claim 10.

* * * * *